March 2, 1965 R. N. KNOSP 3,171,301
AUTOMATIC HEAD POSITIONING APPARATUS FOR MACHINE TOOLS
Filed Sept. 5, 1961 13 Sheets-Sheet 1

INVENTOR.
Robert N. Knosp.
BY Wood, Herron & Evans.
ATTORNEYS.

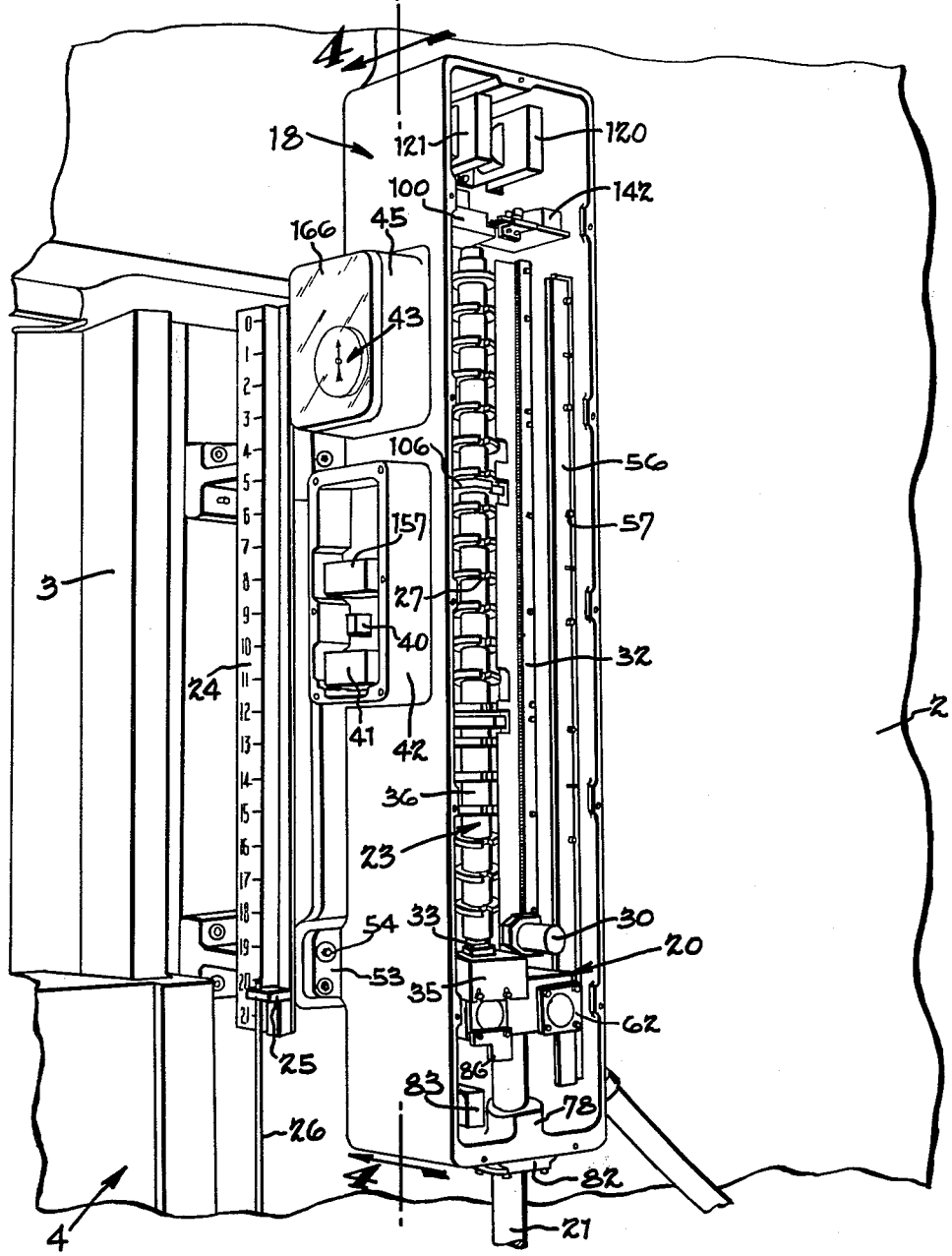

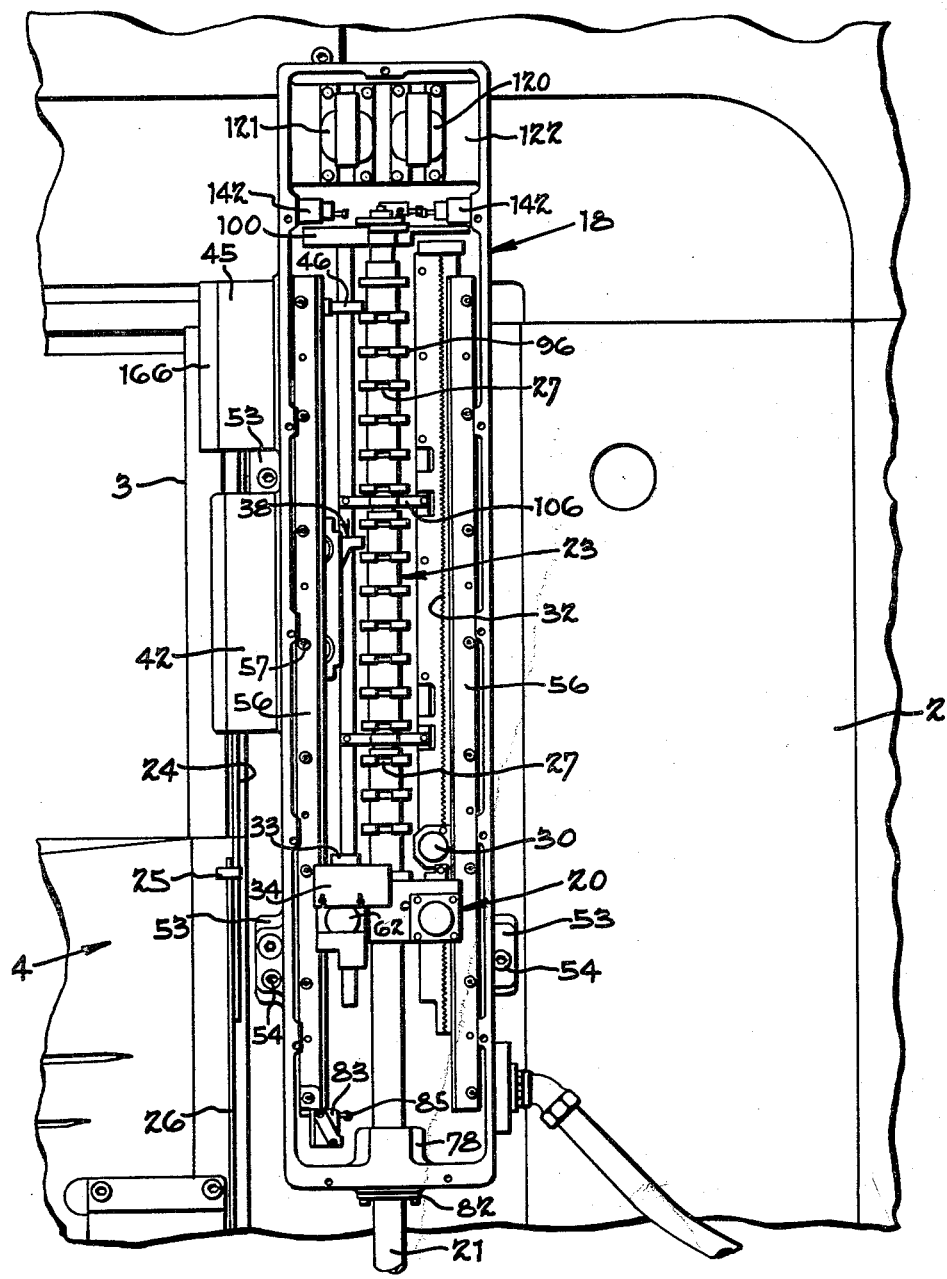

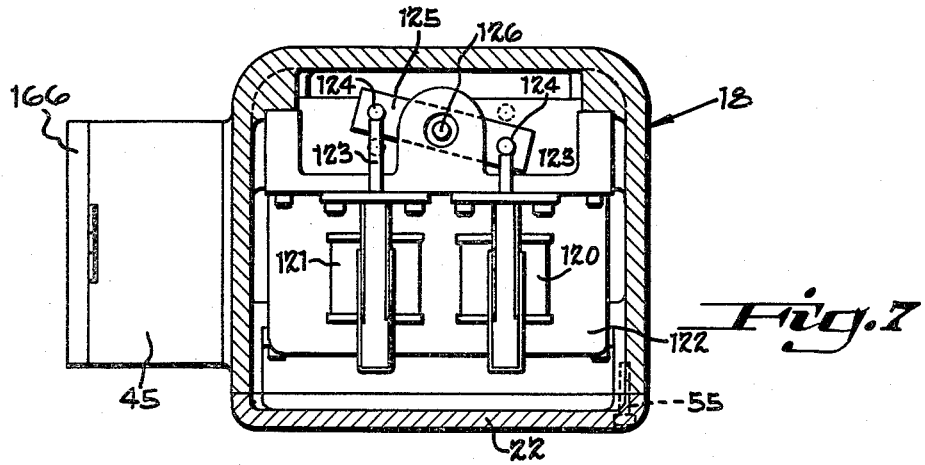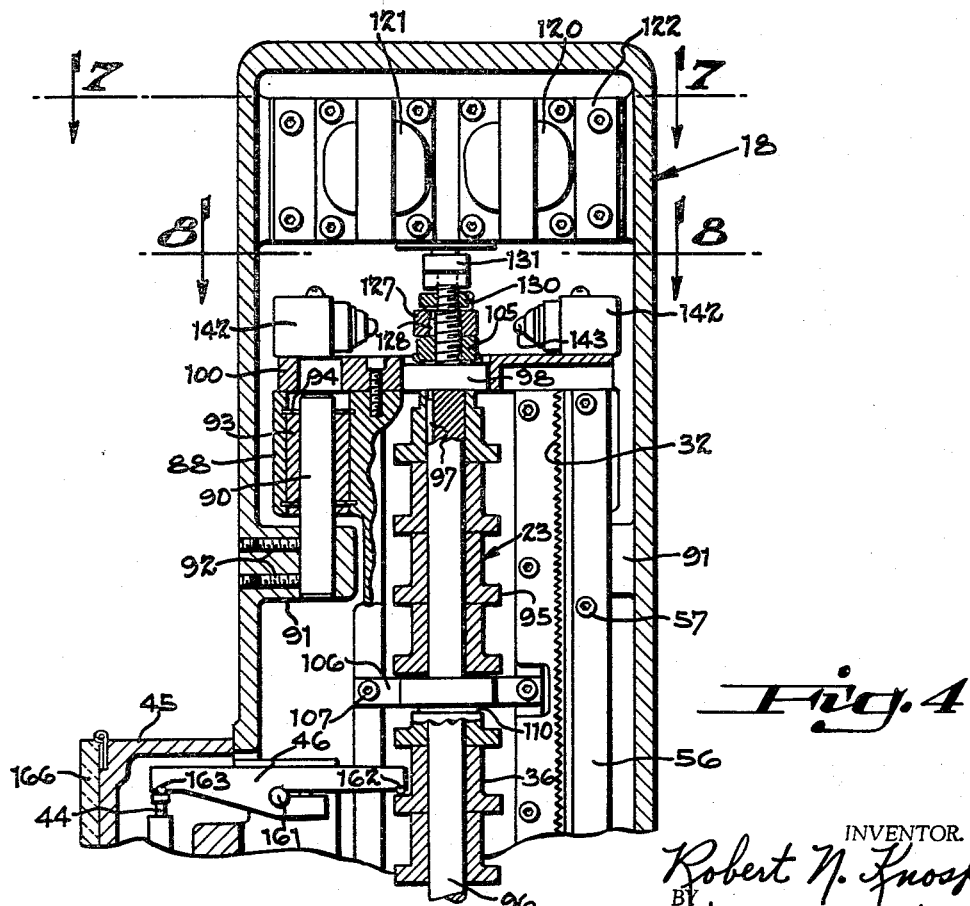

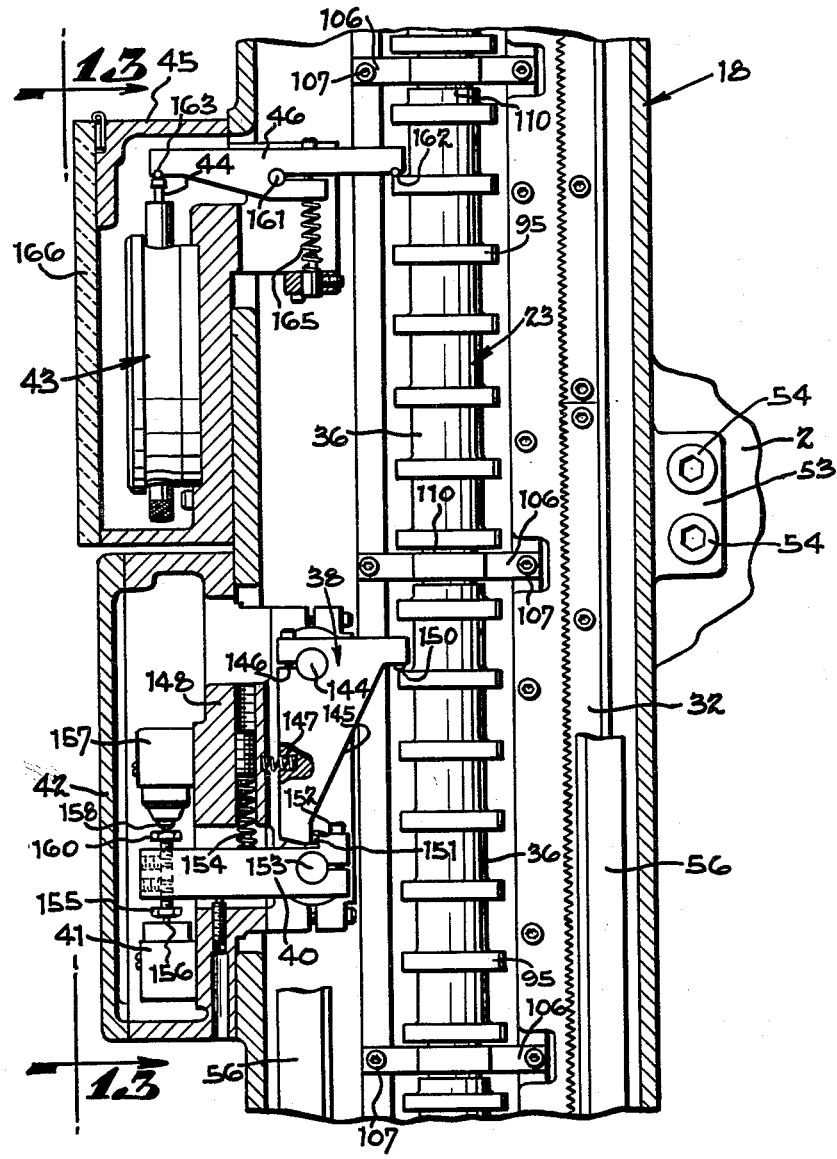

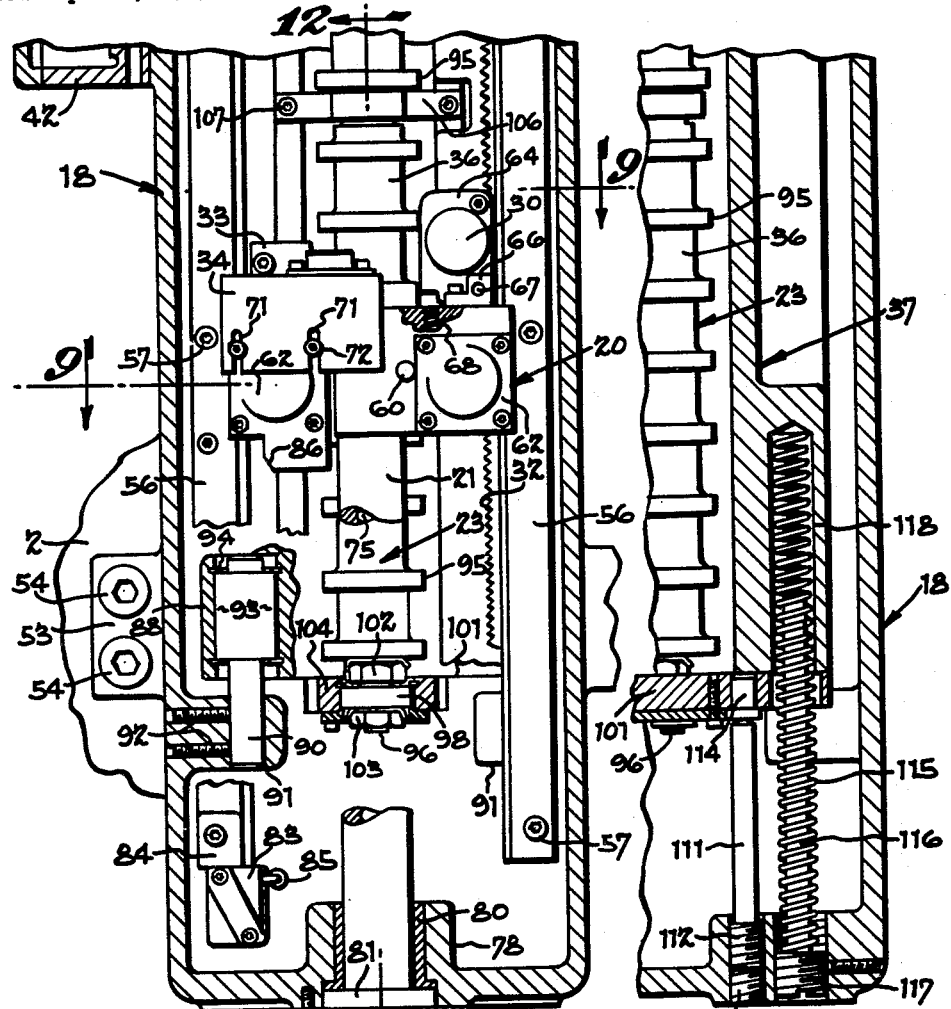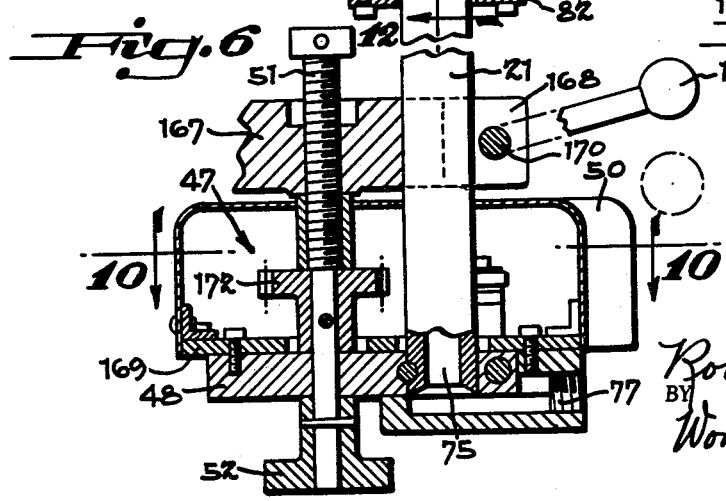

March 2, 1965 R. N. KNOSP 3,171,301
AUTOMATIC HEAD POSITIONING APPARATUS FOR MACHINE TOOLS
Filed Sept. 5, 1961 13 Sheets-Sheet 7

INVENTOR.
Robert N. Knosp.
BY Wood, Herron & Evans.
ATTORNEYS.

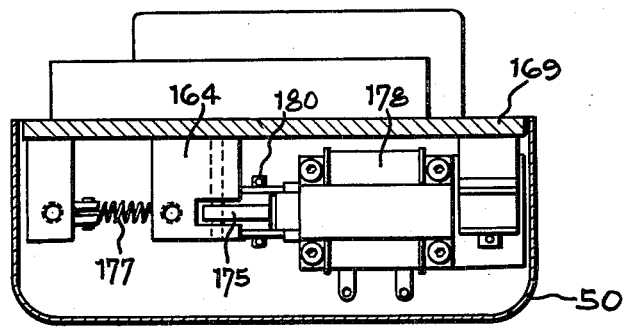
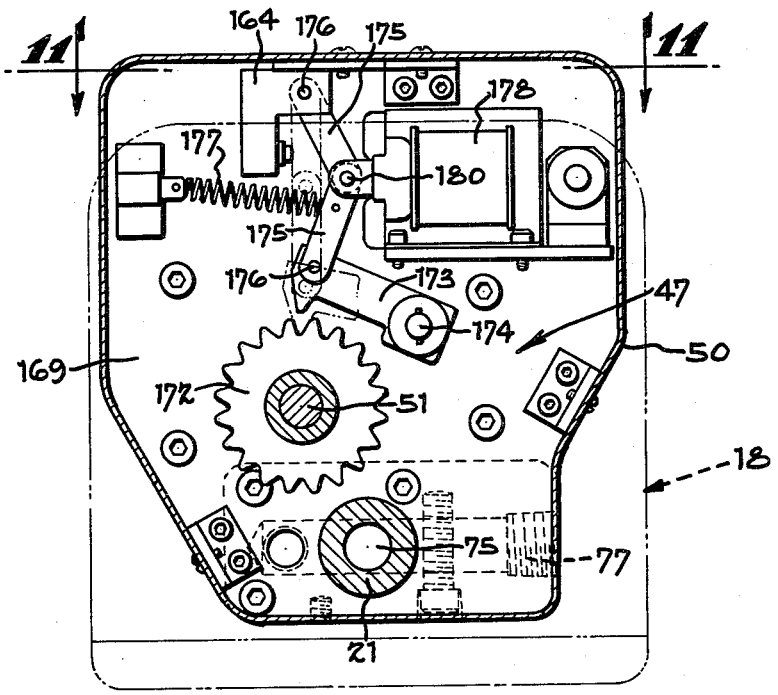

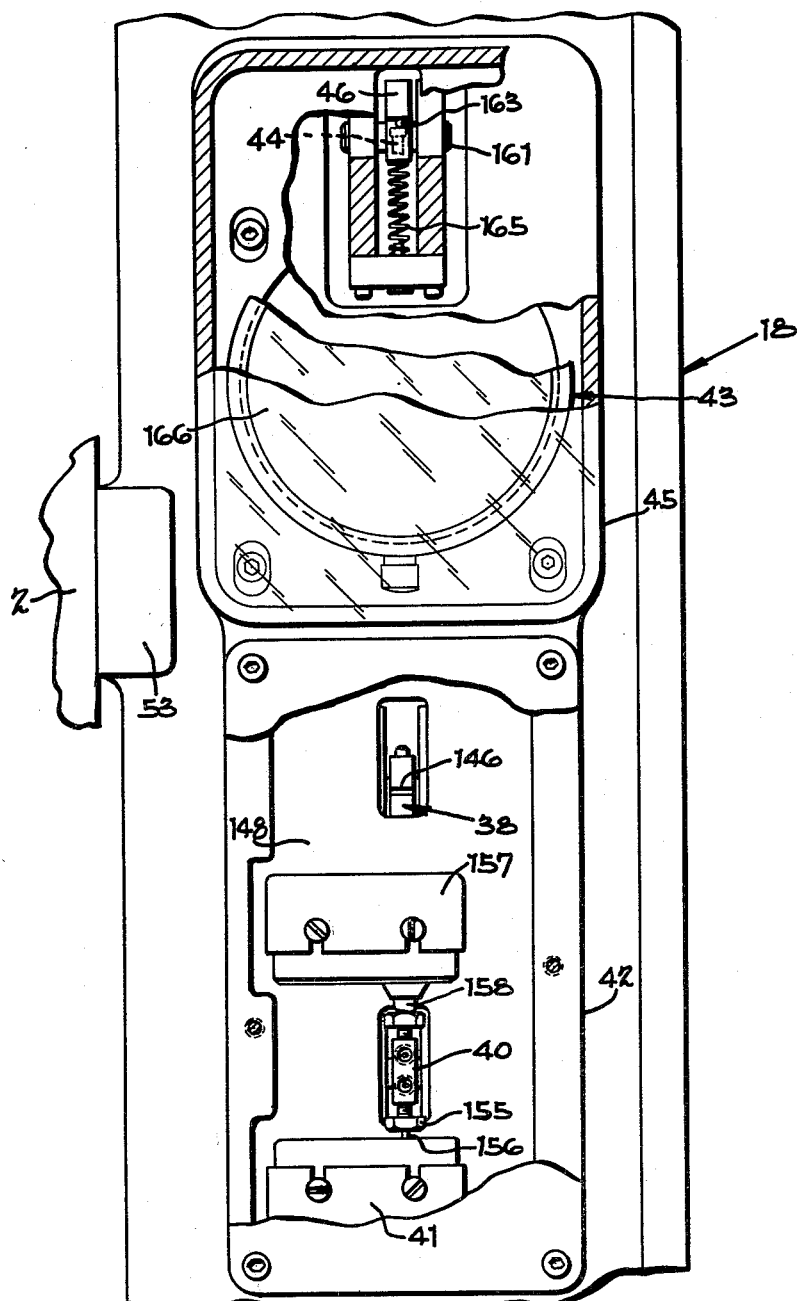

March 2, 1965 R. N. KNOSP 3,171,301

AUTOMATIC HEAD POSITIONING APPARATUS FOR MACHINE TOOLS

Filed Sept. 5, 1961 13 Sheets-Sheet 12

INVENTOR.
Robert N. Knosp.
BY Wood, Herron & Evans
ATTORNEYS.

March 2, 1965  R. N. KNOSP  3,171,301
AUTOMATIC HEAD POSITIONING APPARATUS FOR MACHINE TOOLS
Filed Sept. 5, 1961  13 Sheets-Sheet 13

INVENTOR.
Robert N. Knosp.
BY Wood, Herron & Evans.
ATTORNEYS.

ary control apparatus is interconnected with the numerical control system (Serial No. 786,589), such that the spindle feed cycle is also carried out automatically, along with the other machine functions, under tape control.

United States Patent Office 3,171,301
Patented Mar. 2, 1965

3,171,301
AUTOMATIC HEAD POSITIONING APPARATUS FOR MACHINE TOOLS
Robert N. Knosp, Ludlow, Ky., assignor to The Fosdick Machine Tool Company, Cincinnati, Ohio, a corporation of Ohio
Filed Sept. 5, 1961, Ser. No. 135,879
12 Claims. (Cl. 77—4)

This invention relates to machine tools of the type having a column upon which is slidably mounted a drill head or the like, and is directed particularly to an apparatus for precisely controlling, in an automatic manner, the vertical position of the drill head with respect to the column.

The present head positioning apparatus is disclosed in relation to the jig boring head or drill head of a jig boring machine which is used in drilling, counter-boring, and similar machining operations which involve the precise location of the holes with respect to the workpiece, and also precise control of the depth of the hole, counterbore or the like. A jig boring machine of this type, in general, comprises a stationary bed including a column which slidably mounts the jig boring head for vertical motion. The bed includes a saddle or cross slide mounted below the head and shiftable along one coordinate or path of motion with respect to the bed. Slidably mounted upon the saddle is a work table which is movable relative to the saddle along a second coordinate at right angles to the coordinate of motion of the saddle.

A rotatable tool spindle is mounted in the head for axial motion with respect to a workpiece clamped upon the table, such that a hole center may be precisely aligned with a spindle and its tool by the combined movements of the saddle and table. During the machining operation, the spindle, which is mounted for rotation within an axially shiftable quill, is rotated at a preselected cutting speed and is fed downwardly at a predetermined feed rate with respect to the head by axial motion of the quill with respect to the head.

An apparatus for locating the hole centers automatically with respect to the axis of the spindle is disclosed in Patent No. 2,932,088, issued to Robert N. Knosp, the present applicant. A numerical control system which provides complete automatic regulation of the functions of a jig boring machine is disclosed in the co-pending patent application of Robert N. Knosp et al., Serial No. 786,589, filed January 13, 1959 and now Patent No. 3,109,329. This apparatus, operated under tape control or the like, regulates the table and saddle positioning motion in an automatic manner so as to locate the hole center with respect to the axis of the tool. The numerical control system also provides automatic selection of the spindle speed rates, spindle feed rates, and automatic selection of tools performing different types of machining operations on a given workpiece.

During any automatic machining operation of this character under tape control, a great deal of time is lost as the spindle is advanced and retracted with respect to the head at the relatively slow feed rate which is used during an automatic cutting operation. In order to avoid this loss of time, an automatic spindle feed apparatus has been developed which provides a two-stage spindle feed cycle, the first stage providing rapid advancement of the spindle from a retracted position, the second stage providing advancement of the spindle and its tool at a slower preselected feed rate to a predetermined depth with respect to the work. The spindle control apparatus is disclosed in another co-pending application of Robert N. Knosp et al., Serial No. 51,023, filed on August 22, 1960 and now Patent No. 3,100,406. The automatic It will be understood that the axial spindle and quill travel relative to the drill head is limited by the length of the quill. By way of example, a given machine may provide a practical axial spindle feed motion which is less than the difference in the planes of the workpiece which is being machined. By way of example, if the workpiece includes work surfaces spaced vertically in the neighborhood of eight or more inches from one another, then it is necessary to shift the drill head vertically along the column in order to compensate for the limits of spindle travel when the higher or lower plane is to be machined.

One of the primary objectives of the present invention has been to provide an apparatus for shifting the drill head to predetermined elevations along the column in an automatic manner to compensate for the various planes of a given workpiece, thereby to eliminate the time which is normally consumed in readjusting the head manually.

Another objective has been to provide a simplified system of gauges, and an associated sensing apparatus arranged to locate the head precisely at a predetermined elevation as determined by physical contact with a precisely located gauging surface.

Described generally, the present head positioning apparatus includes a series of gauging elements disposed one above the other and mounted upon a gauge carriage which is shiftable vertically, within limits, during a gauging cycle. A cross head element is interconnected with a drill head so as to move vertically in unison with the head relative to the gauging elements. The gauging elements include abutment surfaces which are spaced apart from one another in precise planes, for example one-inch apart, so as to locate the drill head precisely at selected one-inch levels with respect to the surface of the workpiece.

During a positioning cycle, a traverse motor shifts the drill head and cross head vertically at a rapid rate toward a preselected gauge surface so as to locate the head approximately at the preselected elevation. Thereafter, the traverse motor is decommissioned and a slow speed positioning motor shifts the drill head and cross head upwardly at a slow positioning rate. As the drill head approaches its final position at this slow rate, an abutment, carried by the cross head engages the lower surface of the selected gauge element, thereby to shift the stacked gauges and gauge carriage upwardly.

A motion-amplifying compound lever system is interposed between one of the gauging surfaces and a final positioning switch; the switch in turn is interconnected with a control system, the arrangement being such that the positioning switch is tripped to stop the positioning motor precisely at a final head position. The head is then clamped to the column and the quill and spindle are fed relative to the head at its traverse end feed rates to the predetermined depth. The head positioning apparatus of the present invention is adapted to be controlled, along with the other machine functions, by the numerical control system disclosed in the co-pending application Serial No. 786,589, noted above.

A further objective of the invention has been to provide a simplified transmission system for interconnecting the rapid traverse motor and positioning motor with the drill head without the use of clutches or other elements which would normally be necessary in order to couple the respective motors individually to the head elevating mechanism.

According to this aspect of the invention, the traverse and positioning motors are both in driving connection with a differential type gear train, including planetary gears journalled in a differential cage. The differential cage is keyed to an output shaft which includes a pinion journalled within the head and meshing with a rack secured to the column. When the traverse motor is energized, the positioning motor is deenergized, such that the planetary gears react against the positioning drive system to rotate the differential cage, output shaft and pinion at the rapid traverse rate. When the positioning motor is energized, the traverse motor is deenergized, causing the planetary gear of the positioning drive to react against the traverse drive so as to rotate the differential cage, output shaft and pinion at the slow positioning rate.

The various features and advantages of the invention will be more clearly apparent to those skilled in the art from the following description taken in conjunction with the drawings.

In the drawings:

FIGURE 2 is an enlarged fragmentary perspective view taken from FIGURE 1, showing the head gauging apparatus which is mounted with the column of the machine.

FIGURE 3 is a fragmentary view generally similar to FIGURE 2, further illustrating the gauging apparatus.

FIGURES 4, 5 and 6 are enlarged fragmentary sectional views taken along line 4—4 of FIGURE 2, detailing the gauging apparatus. These views are in fragmentary form in order to provide the proper scale and consist of continuations of one another to show the entire length of the apparatus.

FIGURE 7 is a sectional view taken along line 7—7 of FIGURE 4, illustrating the gauge rotating mechanism.

FIGURE 10 is a sectional view taken along line 10—10 of FIGURE 6, further illustrating the adjustment mechanism which connects the cross head to the drill head for vertical motion therewith.

FIGURE 11 is a sectional view taken along line 11—11 of FIGURE 10.

FIGURE 12 is a fragmentary sectional view taken along line 12—12 of FIGURE 6, detailing the counter spring of the gauge carriage.

FIGURE 13 is a fragmentary elevation as viewed along line 13—13 of FIGURE 5 further illustrating the dial indicator and final limit switch mechanism.

*Machine and operation generally*

Figure 1:
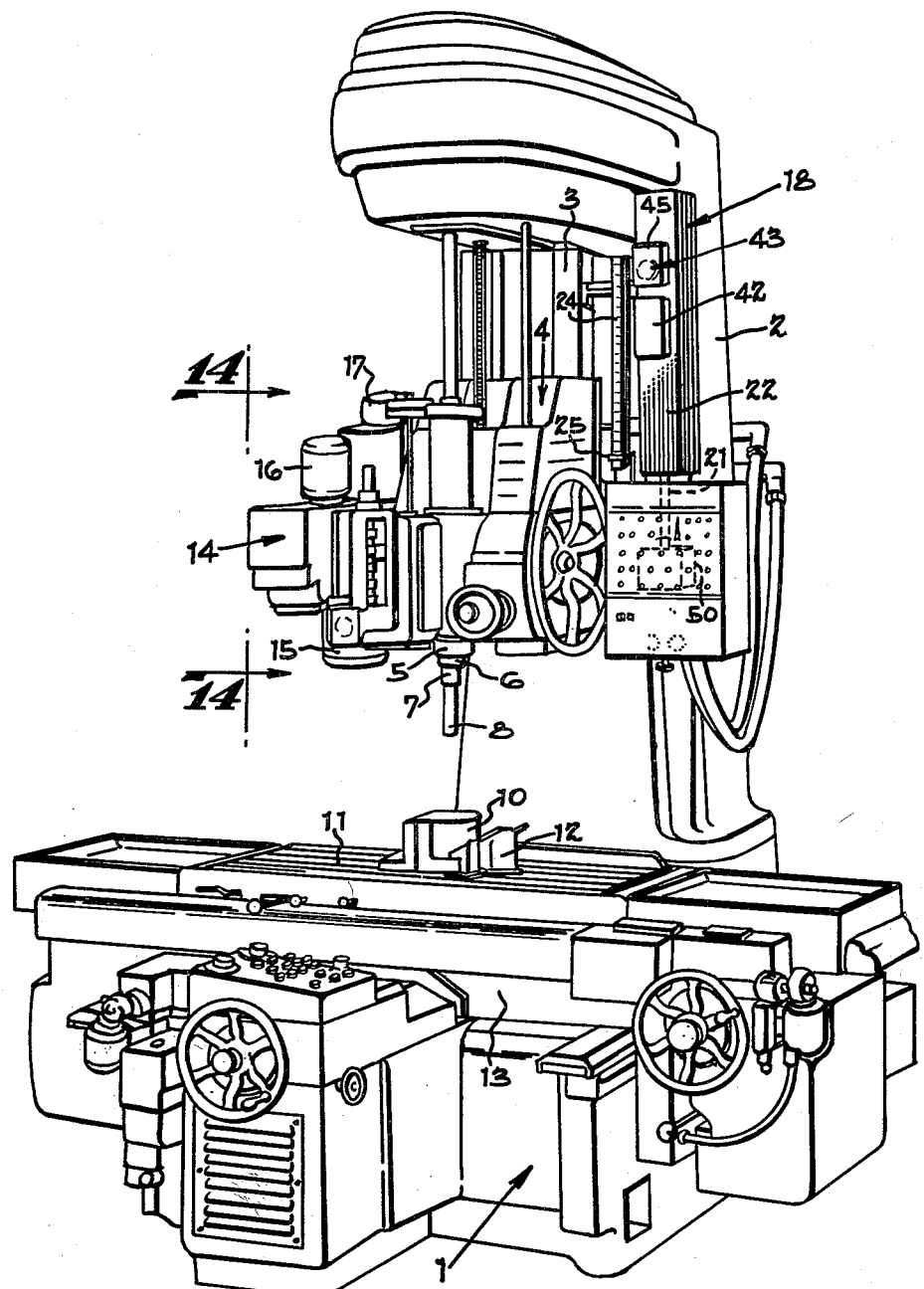
FIGURE 1 is a general perspective view of a numerically controlled jig boring machine equipped with the head positioning apparatus of this invention.

Described generally with reference to FIGURE 1, a jig boring machine embodying the present head positioning apparatus comprises a bed 1 having a column 2 rising upwardly from its rearward side, and having ways 3 slidably confining the drill head or jig boring head 4 for vertical motion relative to the bed. The vertical position of the drill head relative to the bed is regulated by the head positioning mechanism of this invention, as described in detail later.

The drill head 4 includes a vertically slidable quill 5 which includes a spindle 6 rotatably mounted within the quill. The lower end of the spindle, which projects from the quill, includes a chuck 7 of conventional design, in which is mounted a selected tool indicated at 8. The tool 8 may represent a drill, reamer, counter-boring tool or the like. It will be understood, that in machining a plurality of holes in a given workpiece, involving different operations or different hole diameters, it is necessary to mount various tools in the spindle for the several different operations.

The machine includes a variable feed transmission or feed box (not shown) which is in driving connection with the quill and which feeds the quill, spindle and tool axially at a predetermined rate. The machine also includes a variable speed spindle transmission (not shown) which rotates the spindle at a selected rate. The rate of tool feed and speed for a given machining operation is selected under tape control, as shown in the aforesaid pending application Serial No. 786,589. The tape control apparatus also regulates the depth of the machining operation, utilizing the spindle control apparatus disclosed in the co-pending application Serial No. 51,023, which stops the spindle precisely at a predetermined depth.

During a machining or jig boring operation, the workpiece indicated at 10, is clamped upon a work table 11 by a suitable fixture 12, as indicated in FIGURE 1. The table 11 is slidably mounted for longitudinal motion upon a cross slide or saddle 13. The saddle, in turn, is slidably mounted upon the bed 1 of the machine for motion toward or from the column 2, at right angles to the path of motion of the table.

At the start of a given operation under tape control, the workpiece 10 is positioned with respect to the axis of the tool by the combined positioning movements of the saddle and table along the two coordinated paths of motion of the saddle and table. Thus the saddle (carrying the table) is shifted along a line transverse to the bed 1, carrying with it the work table 11 and workpiece. The table in turn, is shifted along the saddle in a path parallel with the bed of the machine thereby locating a given point on the workpiece precisely in alignment with the axis of the tool 8.

Upon completion of the positioning cycle, the tool is fed into the workpiece at the predetermined speed and feed rates provided by the numerical control system, as noted above. It will be understood at this point, that the spindle control apparatus (Serial No. 51,023) is capable of stopping the axial tool feed precisely at the preselected depth. After the control apparatus stops the downward tool feed, the quill, spindle and tool, as a unit, is retracted to an elevated position in preparation for the next positioning cycle under numerical control.

The present head control apparatus is arranged to locate the drill head 4 at predetermined elevations with respect to the surface of the work table to compensate for major differences in the planes of the workpiece 10, since the axial feed motion of the quill relative to the head is limited. By way of example, the total axial quill motion may be in the neighborhood of eight inches from the retracted to the extended position. Therefore, if the next plane of the workpiece to be machined lies at an elevation which is lower than the practical range of axial quill travel, then it is necessary to lower the drill head 4 along column 2 a sufficient distance to compensate for the plane of the next surface to be machined. When this condition is encountered, then the numerical control system sends an electrical impulse which causes the drill head to be lowered the required distance relative to the work surface. It will be understood that if the next work plane is higher, then the drill head will be raised a corresponding distance to compensate for the plane of the work in the same manner.

As shown generally in FIGURE 1, the drill head includes a positioning transmission enclosed in a housing indicated generally at 14, which includes a suitable driving connection for raising or lowering the drill head relative to the column 2. This transmission is arranged to shift the drill head in either direction along the major portion of its travel at a rapid traverse rate and to bring the head to its final position under a slow positioning rate in the up direction. For this purpose, the driving system is provided with a reversible traverse motor 15, and a positioning motor 16 which are energized in sequence during the head positioning cycle. These motors are interconnected with suitable gear trains to provide the desired traverse and positioning rates of motion. At the final position, a clamping motor 17 is energized. This motor is interconnected with a suitable clamping mechanism which clamps the drill head rigidly to the column at its new elevation. The drill head positioning transmission system is described later in detail.

As explained above, it is necessary to adjust the drill head to an elevation roughly approximating the several horizontal planes of the workpiece; however, the final limit of tool travel is determined precisely by the spindle control apparatus (Serial No. 51,023). Since the final position of the quill (depth control) is determined with reference to the drill head itself, it will be understood that the elevation of the drill head must be precisely regulated in order to provide precision depth control of the tool. In the present example, the drill head is raised or lowered in increments of one inch relative to the work surface. These increments are provided by a series of stacked gauges, as described later, which locate the drill head precisely at the selected elevation in multiples of one inch. The spindle control apparatus of the co-pending application (Serial No. 51,023) determines the depth of the tool precisely with reference to the one-inch position of the drill head.

As shown generally in FIGURE 1, the stacked gauges 23 are mounted within a housing, indicated generally at 18, which is attached to the column 2. In order to position the drill head, the housing 18 includes a crosshead, indicated generally at 20 (FIGURE 2), which is connected by a rod 21 to the drill head. The arrangement is such that the crosshead 20 moves vertically, in unison with the drill head, along the stacked gauges within the housing 18. The cross head includes an abutment, as explained later, which coacts with the stacked gauges 23 to locate the drill head at the selected elevation relative to the workpiece.

*Gauging apparatus and operation generally*

As best shown in FIGURES 3–6, the housing 18, which encloses the gauging apparatus, is bolted to the column 2 of the machine and includes a cover plate 22 which seals off the housing to protect the gauging surfaces from dust and dirt. The stacked gauges 23 are shiftably mounted within the housing, for limited vertical motion and for rotary motion, as explained later. In the present example, the stacked gauges 23 provide twenty gauging surfaces, spaced vertically from one another at one-inch spacing and arranged to locate the drill head vertically at one-inch increments.

As noted earlier, the final limit of tool travel is determined precisely by the spindle control apparatus of the co-pending application, which necessarily is determined by the vertical position of the drill head. For this reason, the abutment surfaces of the stacked gauges are accurately finished and located at precise one-inch planes with reference to one another. In order to provide a visual indication of the drill head elevation, there is provided a vertical scale 24 (FIGURE 2) having one-inch graduations corresponding to the abutment surfaces. A pointer 25, which registers with the graduations, is connected to the drill head by a rod 26.

Generally speaking, the stacked gauges 23 are shiftable axially (within limits) within the housing 18 by operation of the crosshead 20 which is connected by the rod 21 to the drill head. As noted earlier, the stacked gauges are also mounted for rotary motion to a gauging or nongauging position. For this purpose, the stacked gauges each include a notch 27 formed in the periphery thereof (FIGURES 3 and 9), the notches 27 being located in axial alignment with one another. The crosshead includes a sensing abutment 28 which is adapted to engage a selected gauging surface during the head positioning cycle.

At the start of a head positioning cycle, as explained in detail later, the stacked gauges are rotated to the nongauging position (FIGURE 17) bringing the notches 27 into alignment with the abutment 28. This permits the drill head 4 and crosshead 20 to move vertically toward the elevation which is signalled by the numerical control system.

The approximate elevation is sensed by a feed-back potentiometer 30 (FIGURES 2, 3, 6 and 9) mounted on crosshead 20 having a rotatable element, the shaft of which includes a pinion 31 meshing with a stationary rack 32 mounted within housing 18. The control circuit includes a series of adjustable trim resistors (not shown), one for each abutment surface of the stacked gauges. The numerical control system is arranged to interconnect the resistor for the selected head elevation with the feed-back potentiometer 30 through a suitable balancing circuit. The arrangement is such that the value of the feed-back potentiometer equals that of the selected trim resistor, the drill head is stopped at its preliminary position. It will be understood, at this point, that this preliminary locating motion is imparted to the drill head at the rapid traverse rate by the traverse motor 15.

After the head is preliminarily positioned, the control system rotates the stacked gauges 23 to the gauging position (FIGURE 18), then the rapid traverse motor is again energized, this time in a direction to shift the drill head 4 upwardly. The crosshead 20 includes a rapid traverse control switch 33 (FIGURE 6) which is mounted on a bracket 34 adjustably secured to the crosshead. This switch includes an arm having a roller 35 (FIGURE 19) which rides upon the periphery of the gauge elements 36. While the rapid traverse motion of the drill head 4 and crosshead 20 is under control of the feed-back potentiometer 30, with the head shifting at the rapid traverse rate (FIGURE 17), the traverse switch 33 has no function. However, when the feed-back potentiometer 30 and the selected trim resistor values are equalized at the preliminary head position, then the control circuit is conditioned to respond to the traverse switch 33.

Figure 17:
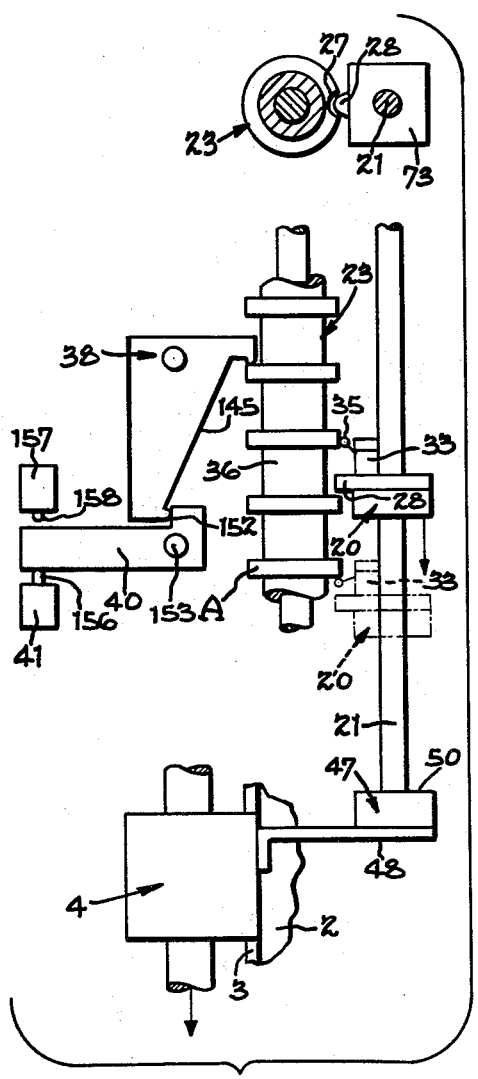
FIGURES 17 and 18 are diagrammatic views illustrating the motion of the parts during the head positioning cycle.
Figure 18:
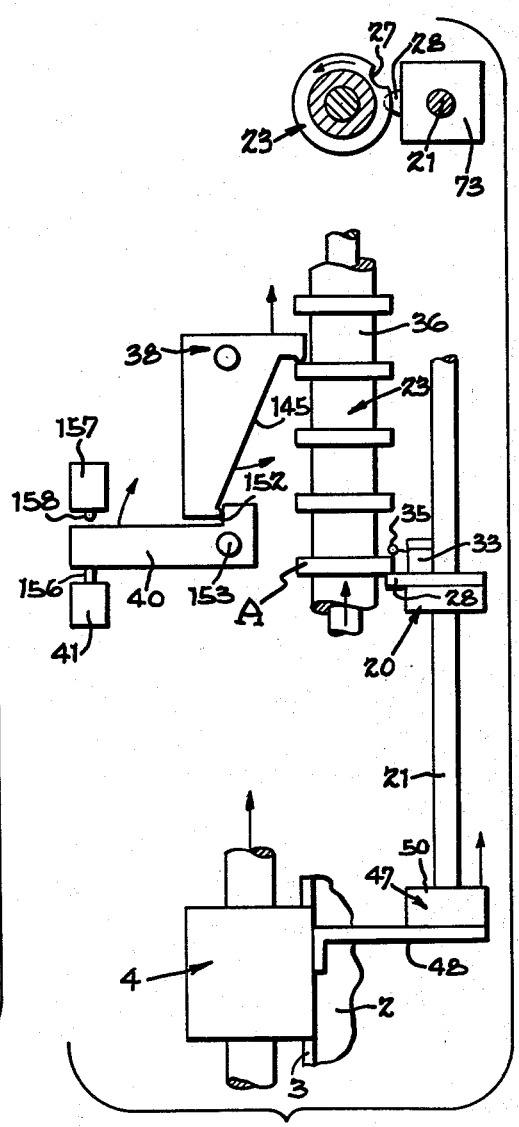

When the control circuit is made responsive to the traverse switch 33, the traverse motor 15 elevates the drill head 4 and cross head 20 until the roller 35 is tripped by the selected gauging element 36, as indicated at A in FIGURES 17 and 18. It will be noted that the abutment 28 is spaced slightly below the lower gauging surface of the selected gauging element A at this point, as shown in broken lines in FIGURE 17. When the switch 33 is thus tripped, the control circuit decommissions the rapid traverse motor 15 and energizes the positioning motor 16 in a direction to shift the drill head in the upward direction. The slow rate makes it possible to locate the drill head precisely in final position by substantially eliminating any over-travel of the parts.

As the positioning motor shifts the drill head upwardly and the crosshead approaches final position, the sensing abutment 28 of the crosshead engages the lower surface of the selected gauging element 36, thereby to shift the stacked gauges 23 upwardly as a unit (FIGURE 18). In order to permit this upward motion, the stacked gauges are mounted within a gauge carriage which is indicated generally at 37 in FIGURE 9. As described later in detail, the carriage 37 is guided by means of rails for vertical motion with respect to the gauge housing 18.

As the crosshead 20 and its abutment 28 shifts the gauges upwardly, a sensing lever, indicated generally at 38 (FIGURES 5, 17 and 18), is engaged by the upper surface of one of the gauging elements 36 and is forced upwardly. Sensing lever 38 is interconnected with a motion-increasing lever 40, which is arranged to trip a final limit switch 41. The switch 41 is mounted in a control box 42, which is attached to the gauge housing 18. The final limit switch 41 is interconnected in the control circuit so as to decommission the positioning motor 16, thereby to stop the drill head at the selected elevation. By virtue of the precisely machined gauging surfaces of the stacked gauges, the slow motion imparted to the drill head by the positioning motor, and the motion increasing action of the sensing lever 38, the drill head is stopped at final position within extremely close limits.

In order to indicate to the operator that the drill head has reached its final position, there is provided a dial indicator shown generally at 43 in FIGURES 2, 5 and 13. This indicator is of conventional design and includes a pointer which indicates in ten-thousandths of an inch the motion which is imparted to its stem 44. The indicator 43 is mounted within an indicator box 45 attached to the gauge housing 18 above the control box 42. The stem 44 of the dial indicator is actuated by a lever 46 having an end which contacts the upper surface of one of the gauging elements in a manner similar to the final position sensing lever 38.

In order to initially set up the head positioning apparatus, that is, to locate a given point on the drill head with reference to the surface of the work table 11, the rod 21 which connects the crosshead 20 to the drill head 4 includes an adjustment mechanism 47 (FIGURES 6 and 10). The adjustment mechanism is mounted upon a bracket 48 which is attached to the drill head, the actuating mechanism being enclosed in a box 50. The adjustment mechanism is connected to the lower end of the rod 21 and includes a screw shaft 51 operated by a knob 52 which is arranged to shift the rod 21 and its carriage 20 with respect to the stacked gauges within the housing 18.

In initially setting up the machine, the drill head may be adjusted vertically until a given reference point on its surface is spaced at a given plane above the surface of the work table. The adjustment mechanism may then be operated so as to cause the stacked gauges 23 to trip the final limit switch 41 at the adjusted elevation of the drill head. Thereafter, the adjustment mechanism is locked, the arrangement being such that the control apparatus subsequently will trip the final limit switch 41 automatically at any one of the one-inch gauging levels which are provided by the stacked gauges 23.

Structural details—gauging mechanism

As shown in FIGURE 3, the gauge housing 18 is provided with a series of mounting lugs 53 which are attached to the column 2 of the machine by screws 54 passing through the lugs and threaded into the column structure. The cover plate 22 is attached by screws 55 threaded into the housing, the plate being removable for access into the housing. The crosshead previously indicated at 20 (FIGURE 9), is mounted for vertical motion upon a pair of rails 56—56 secured by screws 57 along the side walls of the housing 18 near the open side thereof. The crosshead 20 includes a pair of rollers 58—58 at opposite sides, which are provided with V-shaped flanges, the outer edges of the rails 56 being V-shaped in cross section and interfitting the flanges of the rollers to guide the crosshead accurately as it is shifted along the rails.

The body of the crosshead 20 is generally in the form of a metal block which is attached by a pin 60 (FIGURE 6) to the rod 21. The block includes transverse bores confining the roller bearings 61—61 within which the shafts of the rollers 58 are journalled. The ball races are confined within the bores by respective cover plates 62 which are attached to the opposite side of the crosshead by screws.

The rack 32, for rotating the feed-back potentiometer 30, is attached by screws 63 (FIGURE 9) to the gauge carriage 37 and extends parallel with the rails 56 for the full travel of the crosshead. In order to prevent back lash, the pinion 31 is meshed with the rack teeth under preload pressure. For this purpose, the potentiometer is confined within a cage 64 (FIGURES 6 and 9) which is pivotally mounted between a pair of hinge blocks 66 attached to the top surface of the crosshead. A pivot pin 67 passes through the blocks and cage, thus connecting the potentiometer cage to the crosshead for pivotal motion. A compression spring 68 is interposed between the cage and crosshead so as to urge the cage constantly toward the rack 32, thus holding the pinion 31 in meshing engagement with the teeth of the rack 32 under predetermined pressure.

The rapid traverse control switch 33 is mounted on the crosshead adjacent the feed-back potentiometer 30 by means of the angle bracket 34, as noted earlier. In order to adjust the position of the switch, the angle bracket is slotted as at 71, and is secured in place with reference to the crosshead by nuts 72 which are threaded on studs traversed by the slots 71. This arrangement permits the roller 35 of switch 33 to be adjusted to the proper elevation with respect to the gauging abutment, previously indicated at 28.

Figure 9:
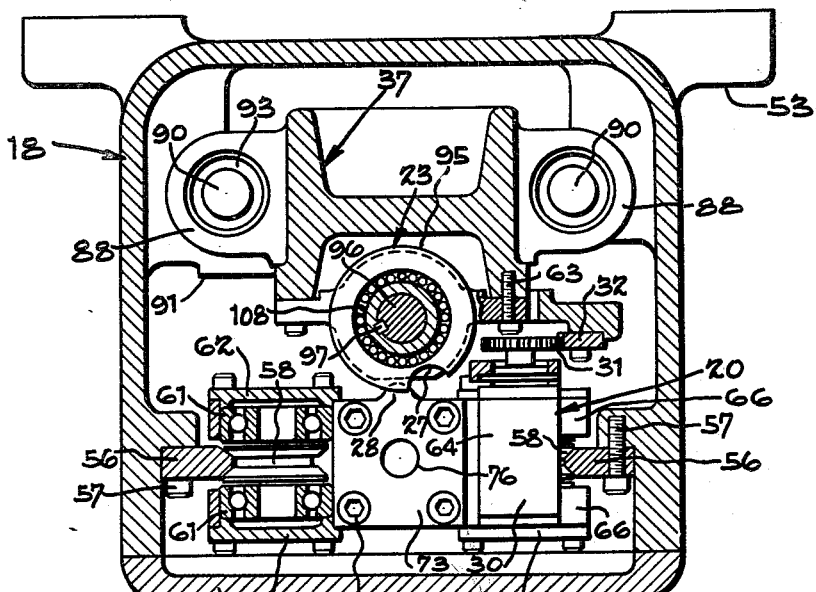
FIGURE 9 is a sectional view taken along line 9—9 of FIGURE 6 detailing the cross head which coacts with the stacked gauges.

As best shown in FIGURE 9, the abutment 28 forms a part of an abutment plate 73, which is attached by screws 74 to the top surface of the crosshead. It will be noted that the actuating rod 21 comprises a tube having a bore 75 (FIGURE 6) communicating with a bore 76 formed in plate 73. The purpose of the bore 76 is to permit the electrical cables (not shown), extending from the potentiometer 30 and switch 33, to pass outwardly from housing 18 through the tubular rod 21. An electrical conduit (not shown) for these wires extends from the lower end of the tube through a fitting 77 which is mounted in the box 50 (FIGURE 6) of the adjusting mechanism. From this point, the conduit extends to a control cabinet (not shown).

The lower end of the housing 18 includes a boss 78 (FIGURE 6) including a bushing 80 providing a slide bearing for the rod 21. A seal ring 81 encircles the rod below the bushing and is held in place by a retainer plate 82. The seal ring prevents the entry of dust and dirt into the housing.

Figure 19:
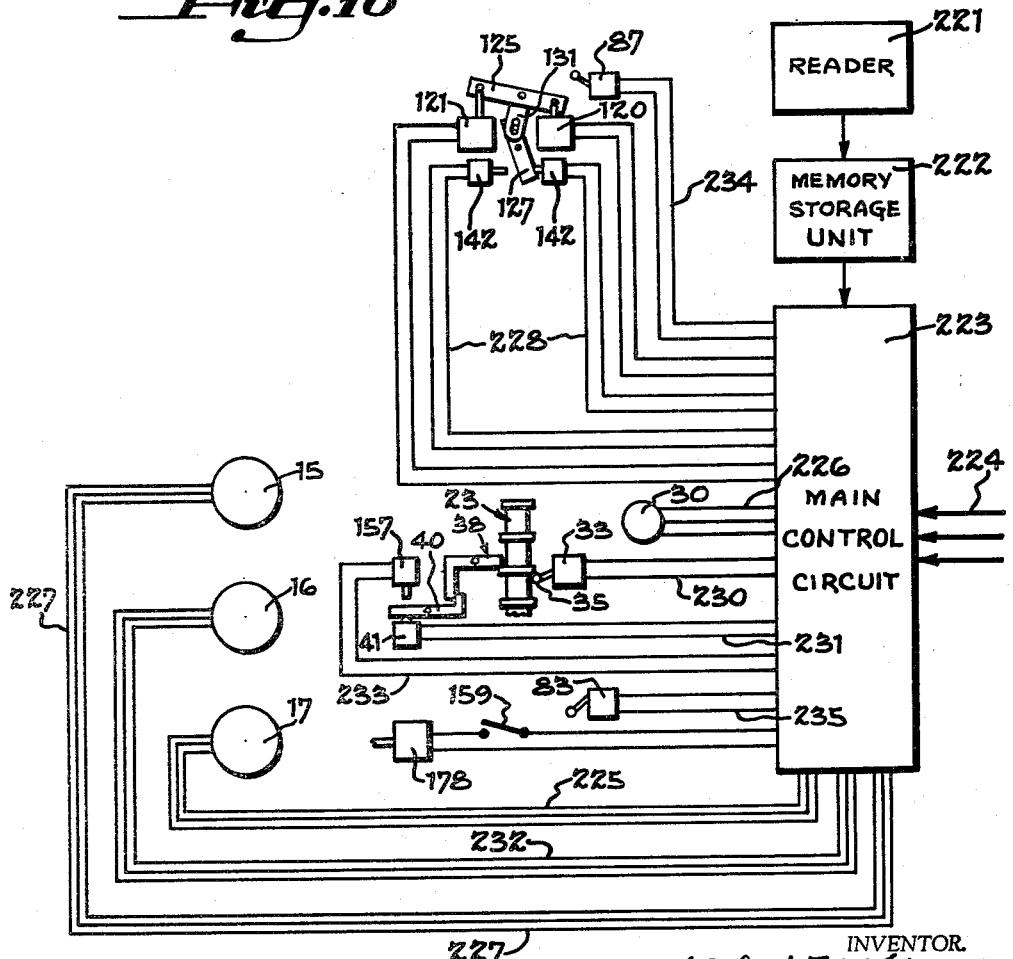
FIGURE 19 is a diagrammatic view generally illustrating the electrical control circuit.

The lower portion of the housing 18, adjacent the boss 78, includes a limit switch 83 mounted on a bracket 84 attached to the housing (FIGURE 6). The limit switch includes a roller 85 adapted to be engaged by the chamfered portion of a trip bar 86 which is attached to the crosshead. The limit switch is interconnected with the control circuit and is arranged to decommission the traverse and positioning motors at the lower limit of travel of the cross head so as to prevent damage to the mechanism. A similar limit switch 87 (not shown) is mounted in the upper portion of the housing 18 and is similarly interconnected with the control system, as indicated in FIGURE 19. This switch is adapted to be tripped at its upper limit of crosshead travel.

As noted earlier, the stacked gauges 23 are mounted for rotary motion upon a gauge carriage, indicated at 37 (FIGURE 9). The gauge carriage is generally of I-beam configuration in cross section and extends longitudinally within the housing 18. The carriage is provided with upper and lower pairs of lugs 88 at opposite sides which slidably interfit respective pairs of slide rods 90—90 mounted within the rearward portion of the housing 18. As best shown in FIGURES 4, 6 and 9, each mounting rod 90 projects upwardly from an ear 91 forming part of the housing 18, the rods being locked in place by set-screws 92. The lugs 88 of the carriage each include a bushing 93 slidably embracing the respective rods and secured in the bore of each lug by retainer rings 94. This arrangement permits the carriage to shift vertically during the head locating and positioning cycle.

The stacked gauging elements 36 are cylindrical and each includes a circular flange 95, the upper and lower surfaces of the flanges providing the gauging surfaces. The clearance notches 27 are formed in the flanges 95. The working surfaces of the gauging elements are precision finished to a high degree of accuracy. These elements each include a cylindrical bore interfitting a shaft 96, upon which the gauging elements are stacked (FIGURES 4, 6 and 9). The shaft and stacked elements are slotted and are keyed as at 97 to the shaft with the notches 27 in alignment with one another.

The upper and lower portions of the shaft 97 are journalled in antifriction bearings 98 which are confined in upper and lower cross plates 100 and 101 forming a part of the gauge carriage. The upper and lower portions of the shaft adjacent the bearings at the top and bottom are threaded and the gauge elements are clamped together by means of respective nuts.

Thus, the lower portion of the shaft includes a nut 102 (FIGURE 6) disposed above the bearing and seated against the lower gauge block. A second nut 103, threaded on the lower portion of the shaft, engages the inner race of the lower bearing. The outer race of this bearing is confined in a retainer block 104 which is attached to the lower cross plate 101. The lower bearing thus confines the lower portion of the shaft and the gauging elements against axial motion.

The upper bearing includes an inner race seated against the upper gauging element (FIGURE 4). A nut 105 is threaded upon the upper portion of the shaft in clamping engagement with the inner race. Accordingly, the gauging elements are clamped between the lower nut 102 and the upper nut 105.

In addition to the upper and lower bearings, the gauge carriage includes a series of intermediate bearing blocks 106 attached by screws 107 to the flanges of the carriage (FIGURES 4, 6 and 9). Each of the intermediate bearing blocks is provided with a needle bearing 108, journalling the reduced hub portion 110 of the bearing elements. The intermediate bearings journal the gauge elements in accurate alignment with the abutment 28 and prevent springing of the stacked gauges. The bearings adapt the gauges to be rotated to their gauging and non-gauging positions with very little resistance, as explained later.

The stacked gauge unit 23, with the carriage 37, resides in a lowered position by gravity during the preliminary portion of the cycle. During this portion of the cycle, the crosshead 20 is shifted relative to the gauges with the gauges rotated to the non-gauging position, as noted earlier. During the final portion of the cycle, when the selected gauging element 36 is engaged by the abutment 28, the stacked gauges and the carriage are shifted upwardly so as to trip the sensing lever 38 and final limit switch 41. During the gauge selection portion of the cycle, the stacked gauges are positioned accurately at a predetermined reference level by a stop pin 111 (FIGURE 12) which is threaded as at 112 through the lower wall of housing 18 and locked in an adjusted position by a threaded plug 113. The upper end of the stop pin engages a button 114 mounted in the lower cross member 101 of the gauge carriage.

In order to increase the sensitivity of operation, there is provided a compression spring 115 arranged to counterbalance the weight load of the carriage and stacked gauge assembly. The compression spring 115 loosely encircles a vertical pin 116 having a threaded portion 117 engaged in the lower wall of housing 18. The lower end of the spring is seated against the threaded portion 117. The upper end of the compression spring is seated against the end of a bore 118 which is formed in the gauge carriage. The spring 115 is under constant compression and exerts an upward force which is equal to approximately 90% of the weight load of the stacked gauge and carriage assembly.

The stacked gauge assembly 23 is rotated to its gauging and non-gauging positions by a pair of solenoids, indicated at 120 and 121 (FIGURES 4 and 7). These solenoids are mounted upon a bracket 122 mounted in the upper portion of housing 18. The solenoids each include an armature having a push rod 123 engaging respective pins 124—124 projecting upwardly from a rock bar 125. The rock bar 125 is keyed to a rock shaft 126 journalled in the mounting bracket 122. The solenoids 120 and 121 are of the push type and are energized alternately by the control system during the positioning cycle to rotate the gauge elements 36 to the gauging or non-gauging positions relative to the abutment 28, as noted earlier. In order to transmit the motion of rock shaft 126 to the stacked gauges, an actuating bar 127 is keyed as at 128 to the upper portion of gauge shaft 96. The actuating bar is clamped in place by a nut 130 threaded on the upper portion of the shaft (FIGURES 4 and 8).

Figure 8:
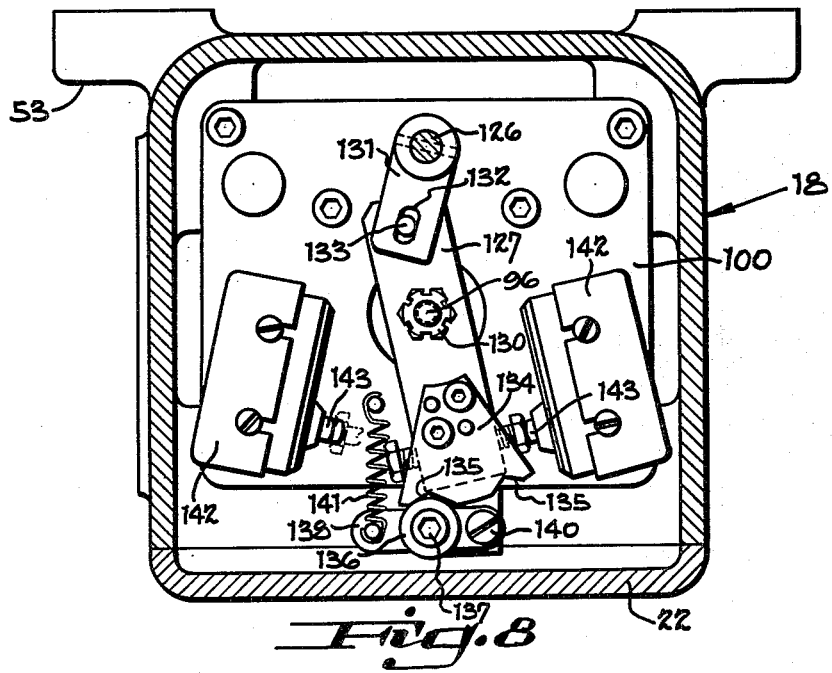
FIGURE 8 is a sectional view taken along line 8—8 of FIGURE 4, further illustrating the gauge rotating mechanism.

As best shown in FIGURES 7 and 8, the rocking motion of rock shaft 126 is transmitted to the gauge shaft 96 by an arm 131 pinned to gauge shaft 96 below the solenoids and having a slot 132 formed in its swinging end. The swinging motion of arm 131 is transmitted to the actuating bar 127 by a pin 133 projecting upwardly from bar 127 and traversing the slot 132.

In order to latch the stacked gauges in the gauging and non-gauging positions referred to earlier, the end bar 127, opposite the pin 133 includes a detent plate 134, having a pair of notches 135—135 engaged by a spring-loaded roller 136 in the gauging and non-gauging positions. The roller 136 is journalled as at 137 upon a detent lever 138 which is pivotally mounted as at 140 to the bracket 122. The swinging end of the detent lever 138 is biased toward the detent plate 134 by a tension spring 141 having one end anchored to a pin carried by the bracket 122, the opposite end of the spring being connected to the swinging end of the lever 138.

In order to signal the control system when the stacked gauges are rotated to the gauging and non-gauging positions, the upper cross piece 100 of the gauge carriage 37 includes a pair of limit switches 142—142 (FIGURES 4 and 8). Each switch includes an actuating stem 143 which is depressed by the actuating bar 127 in the gauging and non-gauging positions of the actuating bar. The switches 142 are interconnected with the control circuit and are arranged to regulate the motion of the crosshead 20 during the positioning cycle.

The sensing lever 38 (FIGURE 5) which trips the final limit switch 41, as noted earlier, is pivotally mounted as at 144 within the control box 42 and is generally of an inverted L-shape, having a vertical portion 145 depending downwardly in the control box 42. The pivot shaft 144 is journalled on the antifriction bearings (not shown) within the control box 42 and includes a split portion 146 which is clamped to the shaft. The lever 38 is biased by a compression spring 147 having one end seated within a bore formed in the wall 148 of the control box, and having its opposite end seated against the vertical portion 145 of the lever. The sensing lever 38 includes a rounded contact portion 150 engaging the upper surface of a selected gauge element. The lower end of the vertical portion 145 includes a second rounded contact portion 151 which engages the heel portion 152 of the motion increasing lever 40.

The motion increasing lever 40 is pivotally mounted in a manner similar to the lever 38 upon a pivot shaft 153, also carried by the control box 142. The motion increasing lever is spring-biased in the downward direction by a compression spring 154 having its lower end seated against the lever 40 and its upper end seated within the wall 148. It will be seen in FIGURES 17 and 18, that upward motion of the stacked gauges will cause the vertical portion 145 of the lever 38 to swing toward the right against the heel portion 152 of the motion increasing lever, thus swinging the lever 40 upwardly about its pivot shaft 153.

The motion increasing lever 40 includes an adjustment screw 155 (FIGURE 5) which is regulated to normally depress the stem 156 of the final position switch 41 (FIGURE 17) prior to the upward motion of the stacked gauges at the final head position. During the final positioning motion, the upward swinging motion of lever 40 unloads the stem 156 of the final position switch. As noted earlier, the final position switch 41 is interconnected with the control circuit to deenergize the positioning motor 16, and thereby to stop the motion of the head precisely at the selected position.

In addition, the control box 42 includes an over-travel switch 157 (FIGURES 5, 17 and 18) having a stem 158 adapted to be engaged by a second adjustment screw 160 projecting downwardly from the lever 40. The over-travel switch 157 is interconnected in the control circuit and is arranged to decommission the positioning motor in the event of a malfunction in the circuit which would otherwise lead to damage.

The lever 46 (FIGURES 5 and 13), which operates the dial indicator 43, is pivotally mounted upon a pivot shaft 161, the shaft being carried by a bracket which forms a part of the indicator box 45. The inner end portion of the lever 46 includes a ball 162 which engages the upper surface of one of the gauge flanges 95. The opposite end of the lever 46 has a similar ball 163 engaging the stem 44 of the dial indicator 43. A compression spring 165 has its upper end seated against the indicator lever 46 to lightly preload the lever toward the stem of the dial indicator. The arrangement is such that the dial indicator may be adjusted to bring its pointer normally to a given setting, whereby the pointer will shift to a predetermined final setting, through operation of lever 46, when the head reaches final position. The dial indicator assures the operator that the mechanism is operating properly. The dial housing 45 includes a transparent cover 166 through which the dial and pointer are visible.

The adjustment mechanism 47, as noted earlier, is mounted upon the bracket 48 which is attached to a drill head. This mechanism imparts vertical adjusting motion to the rod 21, which actuates the crosshead. As best shown in FIGURES 6 and 10, the screw shaft 51, which is rotated by the knob 52, is threaded through a clamp block 167, such that rotation of the knob raises or lowers the block. The clamp block 167 has a bore embracing the rod 21, the endwise portion of the block being split as at 168 to provide a clamping action. A clamp screw 170 traverses the split portion 168 and is actuated by a clamp lever 171. When the clamp is engaged therefore, rotation of the knob 52 and screw shaft 51 raises or lowers the rod 21 with respect to the drill head.

In order to lock the screw shaft 51 in its adjusted position, there is pinned to the shaft a gear 172 which resides within the box 50. A pawl 173 is pivotally connected as at 174 to the bottom plate 169, the pawl being arranged to engage the teeth of the gear, as shown in broken lines (FIGURE 10). The pawl 173 is normally forced to its locking position by a pair to toggle levers 175—175 having their outer ends respectively pivoted as at 176 to the bracket 164 and to the pawl. A compression spring 177, having an end anchored to one of the toggle levers, normally urges the pawl into locking engagement with the gear 172.

A solenoid 178, mounted on the plate 169, has its armature connected as at 180 to the toggle, and is arranged to shift the pawl to the disengaged position when it is necessary to readjust the relative position of the crosshead and drill head. For this purpose, the control circuit includes a manually open switch 159 (FIGURE 19) which is closed to energize the solenoid and thereby to disengage the pawl, as shown in full lines in FIGURE 10. The control circuit preferably includes interconnections with the solenoid 178 to deenergize the solenoid and thereby to lock the screw shaft when the crosshead is adjusted beyond the limits provided by the apparatus, thereby protecting the mechanism from damage.

*Positioning transmission system*

As noted earlier, the drill head 4 is provided with the traverse motor 15, positioning motor 16, and the clamping motor 17. These motors are mounted upon the transmission case 14 (FIGURES 1 and 14) which is bolted to one side of the drill head 4. The traverse motor 15 and positioning motor 16 both drive a common shaft through a differential gear train, the common shaft driving a pinion journalled in the gear head and meshing with a rack which is attached to the column 2, as explained later.

In general, the purpose of the differential gear train is to provide a driving connection from the two motors to the common input shaft 191 (FIGURE 15) without the use of clutches or other elements which would otherwise be required. The differential gear train provides the same gear ratio from the two motors to the input shaft 191. However, in order to drive the shaft 191 at the slow positioning rate, a speed reduction gear train is interposed between the positioning motor 16 and the differential gear train. The reduction gear train is conventional and is enclosed in the gear head 179 (FIGURE 14) forming part of the positioning motor 16.

Described in detail with reference to FIGURES 14, 15 and 16, the traverse motor 15 is coupled to a shaft 182 journalled in the transmission case 14 and having a worm 183 meshing with a worm wheel 184. The worm wheel 184 is keyed as at 185 to a sleeve 186 which includes a traverse drive gear 187. The worm wheel 184 and sleeve 186 are mounted for rotation upon ball bearings 188—188. As explained later in detail, a positioning shaft 190 telescopically interfits the sleeve 186 and is mounted for rotation relative to the sleeve.

It will be understood at this point, that rotation of the worm wheel 184 and sleeve 186 by the traverse motor 15 provides rapid traverse of the drill head, while rotation of the positioning shaft 190 relative to the sleeve 186 imparts motion to the head at the positioning rate. The differential transmission system is in driving connection with the common input shaft 191, which is co-axial with positioning shaft 190 and which includes a pinion 192 meshing with a rack 193 (FIGURE 15). Shaft 191 is journalled in the drill head 4, while the rack 193 is attached to the column; hence rotation of the pinion 192 by the traverse motor 15 raises or lowers the head at a rapid rate. On the other hand, rotation of the pinion by the positioning motor 16 raises the drill head at the slow positioning rate.

The differential transmission system includes a differential cage 194 having one end journalled upon ball bearings 195 releative to the transmission case. The opposite end of the cage is journalled upon the ball bearings previously indicated at 188 of the sleeve 186, adapting the cage 194 to rotate relative to the sleeve 186 and also relative to the positioning shaft 190.

The traverse drive gear 187 of sleeve 186 meshes with a planetary gear 197 which is journalled upon a stub shaft 198 carried by the differential cage 194. The planetary gear 197 meshes with an idler gear 200 journalled on a second stub shaft mounted in the differential cage 194. The idler gear 200 meshes with a positioning drive gear 201, which is fixed to the positioning shaft 190.

It will be understood that the positioning shaft 190 and its gear drive 201 remain locked in a stationary position (through a worm and wheel drive) while the traverse motor is energized. Thus, rotation of the traverse worm wheel 184 rotates the sleeve 186 and traverse drive gear 187 in turn, tends to rotate the planetary gear 197. However, the planetary gear 197 meshes by way of the idler gear 200 with the stationary positioning drive gear 201 of the positioning shaft. Therefore, as the traverse drive gear 187 rotates, the planetary gear 197 and its idler 200 rotate in an orbit about the gears 187 and 201, thus rotating the differential cage. The shaft 191 includes a splined end portion 202 providing a keyed connection with the hub 203 of the differential cage, thus rotating the shaft and its pinion 192 so as to raise or lower the head at the traverse rate.

The reduction gear head 179 of the positioning motor 16 drives a shaft 199 having a worm 204 meshing with a worm wheel 205 which is keyed as at 206 to the positioning shaft 190. When the positioning motor is energized to rotate the worm wheel 205 and positioning shaft 190 (with the traverse worm wheel 184 and its sleeve 186 locked in stationary position), then the gear positioning drive 201 of shaft 190 is rotated relative to the stationary differential cage. The positioning drive gear 201 meshes with the planetary gear 207, journalled in the differential cage upon a second stub shaft 198. Planetary gear 207 meshes with an idler planetary gear 208, which in turn meshes with the traverse drive gear 187 of sleeve 186 which is locked in stationary position. Accordingly, the rotary motion of gear positioning drive 201 rotates planetary gear 207. Since the idler gear 208 connects the planetary gear 207 with stationary gear 187, the planetary gears 207 and 208 will be driven in an orbit about gear 287. Hence the differential cage will be rotated at the positioning rate as provided by the gear head 179 of the positioning motor 16. The differential cage 194 thus rotates the input shaft 191 causing the head to be elevated at the positioning rate.

Figure 14:
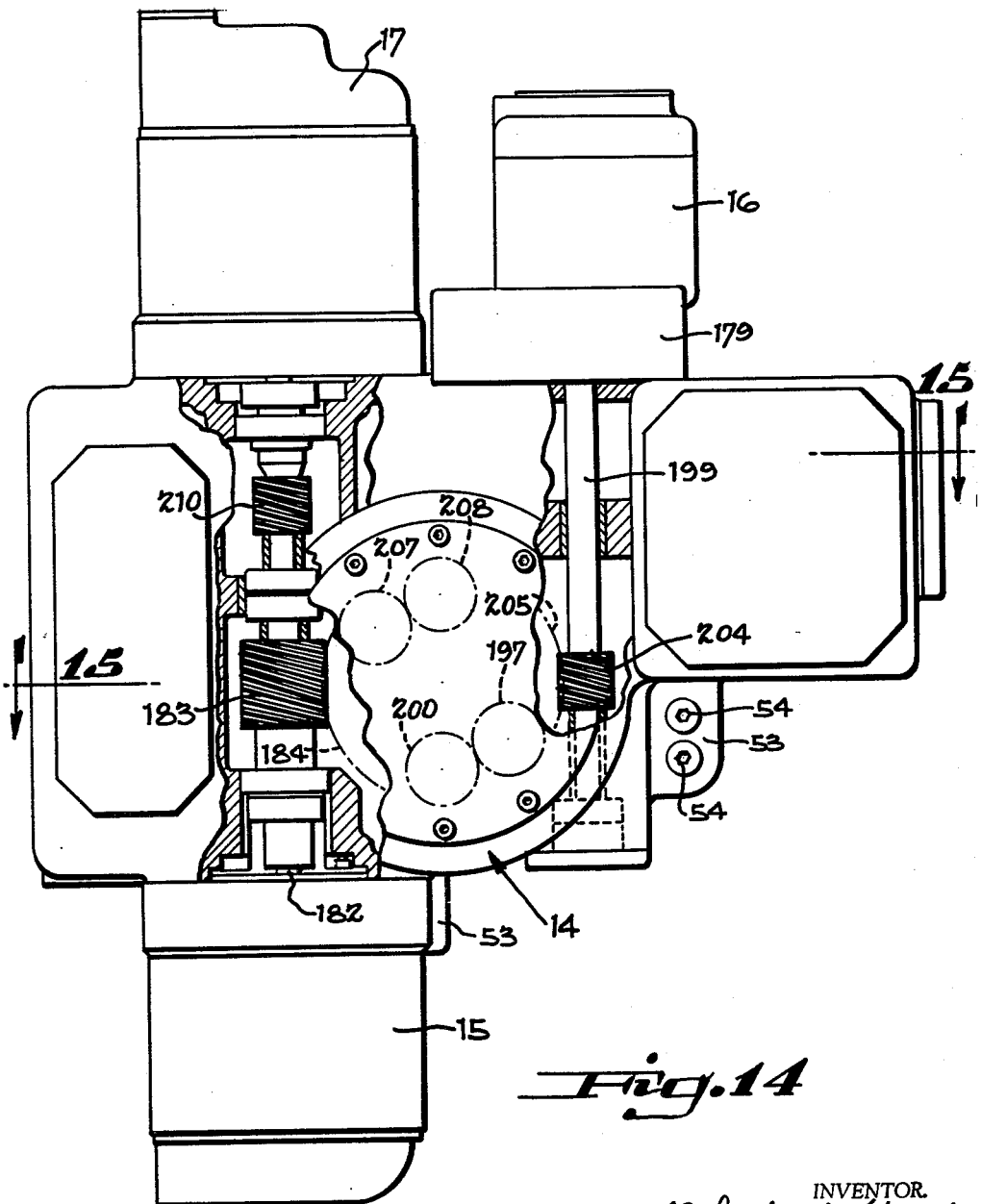
FIGURE 14 is a fragmentary side elevation as viewed along the line 14—14 of FIGURE 1, illustrating the differential transmission which raises and lowers the drill head.
Figure 15:
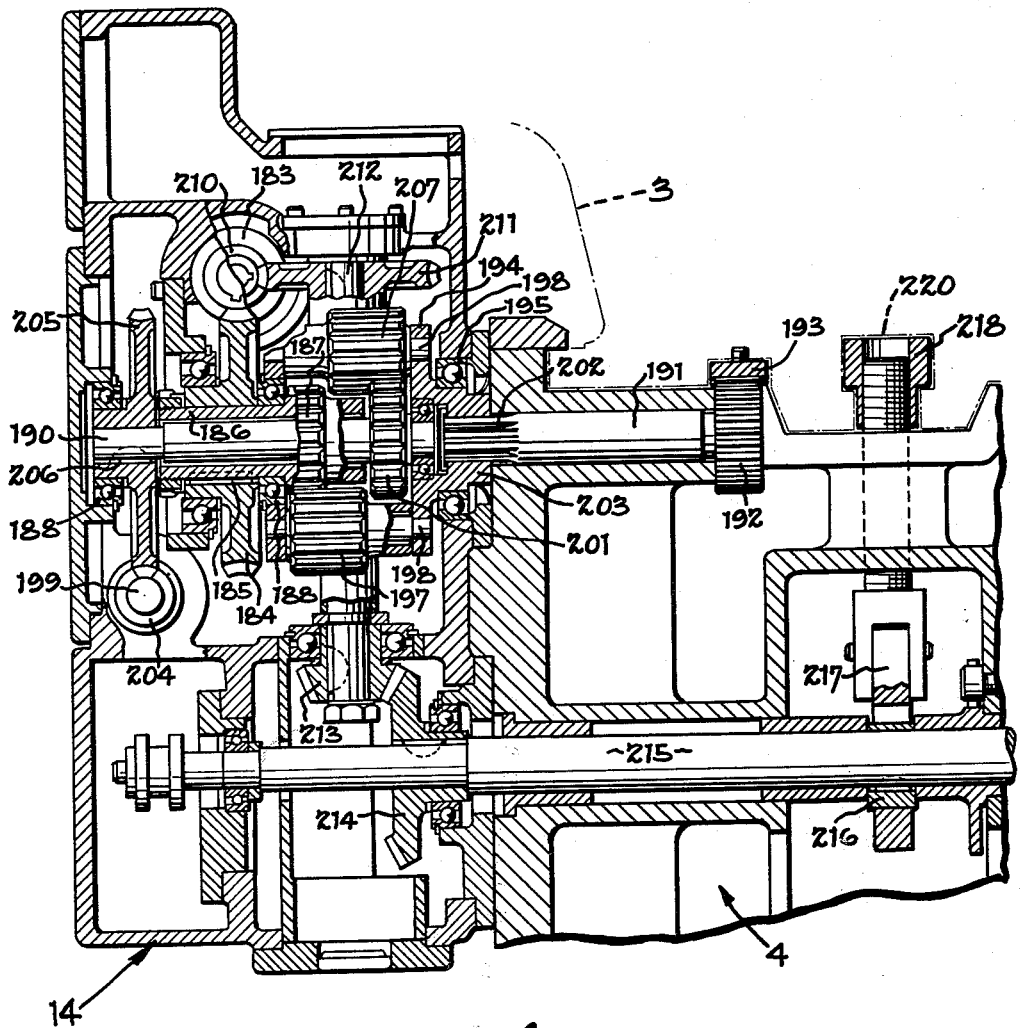
FIGURE 15 is a sectional view taken along line 15—15 of FIGURE 14, further illustrating the differential transmission and head driving system.
Figure 16:
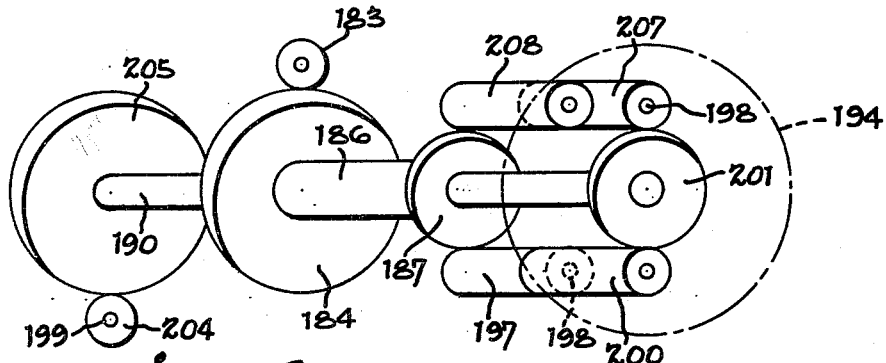
FIGURE 16 is a diagrammatic view illustrating the differential gear train.

As shown in FIGURES 14 and 15, the clamp motor 17 is mounted in a position co-axial with the traverse motor 15, and its shaft includes a worm 210. Worm 210 meshes with a worm wheel 211 mounted on a vertical shaft, 212 which is journalled within the housing 14. The lower end of the vertical shaft includes a small bevel gear 213, meshing with a large bevel gear 214 which is keyed to a horizontal shaft 215. The horizontal shaft includes an eccentric 216 acting upon a yoke 217 which is adjustably connected to a clamp block 218. Block 218 traverses a vertical T-slot 220 formed in the column way 3. Rotation of the clamping motor in clamping direction draws the head firmly into clamping engagement with the column, while rotation in unclamping direction disengages the clamp block 218, permitting the drill head to be raised or lowered along the column ways.

*Control circuit*

As noted earlier, the present head positioning apparatus is controlled by the circuit disclosed in co-pending application Serial No. 786,589 which also regulates the spindle positioning apparatus shown in co-pending application Serial No. 51,023. The control circuit shown in block form in FIGURE 19, represents, in a general way, the circuits shown in the co-pending applications. Since the control circuit of the present apparatus does not form an essential part of the invention, the various details have been omitted.

As indicated at 221, the tape reader reads the data for a given operation, including the saddle and table position, tool selection, spindle depth, and also the drill head position, as gauged by the present apparatus. The reader decodes this information and transmits the corresponding signal impulses to the data storage unit indicated at 222 where this information is stored.

Thus, when the machine is executing a given operation, the instructions for the next operation are decoded and stored in the memory unit. At the end of a given operation, the instructions are fed from the storage unit 222 to the main control circuit, which is indicated at 223.

When the memory storage unit signals for a change in the drill head position, a circuit is completed from the power input lines 224 through the main control circuit to the lines 225 which energize the reversible clamp motor 17 in a direction to unclamp the head.

At this point, the traverse motor 15 is also energized to shift the drill head and crosshead downwardly, so as to relieve the pressure of the abutment relative to the stacked gauges 23; the motor is then deenergized. At this time, a selected trim resistor, within the main control circuit, is interconnected by way of the lines 226 with the feed-back potentiometer 30. After the gauges are relieved of pressure, as above noted, the main control circuit also energizes one of the gauge solenoids 120 so as to shift the stacked gauges to the non-gauging traverse position shown in FIGURE 17.

When the gauges are shifted to the nongauging position, the gauge actuating bar 127 trips one of the limit switch 142 so as to signal the main control circuit that the gauges have been rotated.

The traverse motor 15 is now energized to shift the drill head and crosshead toward the selected gauge element, as signalled by the potentiometer circuit. This circuit, which forms part of the main control circuit, compares a given position of the head with the required new position (which is signalled by the memory storage unit 222) and sets up a circuit by way of the lines 227 to energize the rapid traverse motor to shift the head in the required direction, as indicated in FIGURE 17. As the crosshead 20 shifts along the gauges, for example in the downward direction (FIGURE 17), the rapid traverse switch 33 is tripped as it engages the successive gauging elements 36; however, the switch has no function during this portion of the cycle.

During the traverse motion, the potentiometer 30 (which is driven by the rack 32) senses the approximate position of the crosshead 20 and drill head 4. When the value of the potentiometer and trim resistors are approximately balanced, then the main control circuit deenergizes the traverse motor 15 so as to stop the head with the abutment 28 residing below the surface of the selected gauging element 36. At this point, the control circuit energizes the second solenoid 121 to shift the stacked gauges to the gauging position, as shown in FIGURE 18. When the gauges are thus rotated, one of the gauge sensing switches 142 signals the main control circuit by way of the lines 228 that the gauges have been shifted to the gauging position.

In response to the tripping of switch 142, the control circuit places the rapid traverse switch 33 in the circuit by way of the lines 230 and also energizes the traverse motor 15 in the up direction, causing the head and crosshead to be moved upwardly at the rapid traverse rate. This upward motion continues until the roller 35 of the traverse switch 33 is tripped by the gauging element A, as shown in broken lines in FIGURE 17. The element A determines the selected final position of the drill head.

When the traverse switch 33 is tripped, it signals the main control circuit by way of its lines 230, whereupon the circuit deenergizes the traverse motor 15 and energizes the positioning motor 16, so as to move the drill head and crosshead upwardly at the slow traverse rate.

This motion continues until the abutment 28 engages the lower surface of the selected gauge element and thereby shifts the stacked gauges upwardly (FIGURE 18). When the final position is reached, the final position switch 41 is tripped, thereby sending a signal by way of the lines 231 to the main control circuit. The control circuit in turn, deenergizes the positioning motor 16 by way of the lines 232 and energizes the clamping motor 17 in the clamping direction by way of lines 225, thus ending the positioning cycle.

In the event that the crosshead overtravels its predetermined position through a malfunction, then the sensing lever 38 will trip the over-travel safety switch 157. This switch is interconnected with the control circuit by way of the lines 233 and is arranged to decommission the traverse and positioning motors. In addition, the upper limit switch 87 is interconnected with the control circuit by way of the lines 234 to stop the crosshead at its upper limit of travel for safety purposes. The lower limit switch 83 is connected to the main control circuit by way of the lines 235 for the same purpose.

Having described my invention, I claim:

1. A position control apparatus for locating the head of a machine tool relative to a stationary support element, said head having power means for shifting the same with respect to the support element, said control apparatus comprising, a plurality of gauging elements spaced apart from one another and mounted for rotary motion, said gauging elements extending generally parallel with the support element, power means adapted to rotate said gauging elements to a gauging or non-gauging position, a crosshead element connected to the head for movement with the head relative to said spaced gauging elements, an abutment element mounted on said crosshead element, said abutment element adapted to advance relative to the gauging elements with the same in a non-gauging position and to engage a selected gauging element when said gauging elements are rotated to said gauging position, and a control element interconnected with the gauging elements and with the power means of the head, said control element adapted to decommission the power means of the head, thereby to stop the head in response to engagement of the selected gauging element by said abutment element.

2. A position control apparatus for locating the head of a machine tool relative to a stationary support element, said head having power means for shifting the same with respect to the support element, said control apparatus comprising, a plurality of gauging elements spaced apart from one another and mounted for rotary motion, said gauging elements extending generally parallel with the support member, each of said gauging elements having a flange which includes a relief area providing a non-gauging position, power means adapted to rotate said gauging elements to a gauging or non-gauging position, a crosshead element connected to the head for movement therewith relative to said gauging elements, an abutment element mounted on said crosshead element, said abutment element adapted to advance relative to the relief areas of the gauging elements when the same are rotated to the non-gauging position and to engage the flange of a selected gauging element when said gauging elements are shifted to said gauging position, and a control element interconnected with the power means of the head and adapted to stop the head in response to engagement of the selected gauging element by said abutment means.

3. A position control apparatus for locating the head of a machine tool relative to a stationary support element, said head having power means for shifting the same with respect to the support element, said control apparatus comprising, a plurality of gauging elements spaced apart from one another and mounted for rotary motion, said gauging elements extending generally parallel with the support element, a pair of solenoids mounted adjacent said gauging elements, linkage means connecting said solenoids to the gauging elements and adapted to rotate said gauging elements to a gauging or non-gauging position, a crosshead element connected to the head for movement with the head relative to said spaced gauging elements, an abutment element mounted on said crosshead element, said abutment element adapted to advance relative to the gauging elements with the same in a non-gauging position and to engage a selected gauging element when said gauging elements are rotated to said gauging position, and a control element interconnected with the gauging elements and with the power means of the head, said control element adapted to decommission the power means of the head, thereby to stop the head in response to engagement of the selected gauging element by said abutment element.

4. A position control apparatus for locating the head of a machine tool relative to a stationary support element, said head having power means for shifting the same with respect to the support element, said control apparatus comprising, a plurality of gauging elements spaced apart from one another and mounted for rotary motion, said gauging elements extending generally parallel with the support member, each of said gauging elements having a flange which includes a relief area providing a non-gauging position, a pair of solenoids mounted adjacent said gauging elements, linkage means connecting said solenoids to the gauging elements and adapted to rotate said gauging elements to a gauging or non-gauging position, a crosshead element connected to the head for movement therewith relative to said gauging elements, an abutment element mounted on said crosshead element, said abutment element adapted to advance relative to the relief areas of the gauging elements when the same are rotated to the non-gauging position and to engage the flange of a selected gauging element when said gauging elements are shifted to said gauging position, and a control element interconnected with the power means of the head and adapted to stop the head in response to engagement of the selected gauging element by said abutment means.

5. A position control apparatus for locating the head of a machine tool relative to a stationary support element, said head having power means for shifting the same with respect to the support element, said control apparatus comprising, a plurality of gauging elements spaced apart from one another and mounted for rotary motion, said gauging elements extending generally parallel with the support member, each of said gauging elements having a flange which includes a relief area providing a non-gauging position, a pair of solenoids mounted adjacent said gauging elements, linkage means connecting said solenoids to the gauging elements and adapted to rotate said gauging elements to a gauging or non-gauging position, a crosshead element connected to the head for movement therewith relative to said gauging elements, an abutment element mounted on said crosshead element, said abutment element adapted to advance relative to the relief areas of the gauging elements when the same are rotated to the non-gauging position and to engage the flange of a selected gauging element when said gauging elements are shifted to said gauging position, a pair of gauge control switches mounted adjacent said linkage means and adapted to be actuated by the linkage means, said switches adapted to provide energization of the power means of the head when the gauges are in said non-gauging position, and a control element interconnected with the power means of the head and adapted to stop the head in response to engagement of the selected gauging element by said abutment means when the gauge elements are shifted to the gauging position.

6. A position control apparatus for locating the head of a machine tool relative to a stationary support element, said head having power means for shifting the head with respect to the support element, said control apparatus comprising, a gauge carriage mounted for motion generally parallel with the support element, a plurality of gauging elements spaced apart from one another and mounted for rotary motion in said carriage, said gauging elements extending generally parallel with the support element, power means adapted to rotate said gauging elements to a gauging or non-gauging position, a crosshead element connected to the head for movement with the head relative to said gauging elements, an abutment mounted on said crosshead element, said abutment element adapted to engage a selected gauging element during movement of the head and crosshead when said gauges are rotated to said gauging position, thereby to shift the gauge carriage and gauges along a path generally parallel with the support element, and a control element interconnected with the gauging elements and adapted to be tripped thereby when the selected gauging element is engaged and shifted with the carriage by said abutment element, said control element interconnected with the power means of the head and adapted to decommission the same, thereby to stop the head in response to engagement of the gauging element with the abutment element.

7. In a machine tool having a vertical column and having a drill head slidably mounted on the column, said drill head having power means for shifting the same relative to the column, an apparatus for automatically positioning the drill head relative to the column comprising, a gauge carriage mounted for motion parallel to the column, a series of stacked gauge elements mounted for rotary motion in said gauge carriage, a crosshead mounted for motion parallel with said stacked gauge elements, means connecting the crosshead to the drill head for moving the crosshead relative to the gauging elements in unison with the movement of the drill head by the said power means, an abutment element mounted on the crosshead and adapted to engage the surface of a selected gauge element, each of said gauging elements having a relief area adapted to provide clearance relative to the abutment element, gauge rotating means for rotating the stacked gauging elements to a non-gauging position with said relief areas disposed in registry with said abutment element, adapting the drill head and crosshead to be shifted by the power means relative to the gauging elements, means for energizing the said gauge rotating means for rotating the stacked gauging elements to the gauging position after the abutment element resides adjacent a selected gauging element, means adapted to energize the said power means in a direction to shift the crosshead and abutment element into engagement with the selected gauge element, and means adapted to deenergize the power means when the abutment engages the selected gauging element and shifts the stacked gauges and gauge carriage in said path parallel to the column.

8. In a machine tool having a vertical column and having a drill head slidably mounted on the column, said drill head having an input shaft adapted to shift the drill head relative to the column, an apparatus for automatically positioning the drill head relative to the column comprising, a rapid traverse motor and a positioning motor, a differential transmission system connecting said motors to the input shaft, a series of stacked gauge elements mounted for rotary motion, a crosshead connected to the drill head for motion parallel with said stacked gauge elements, in unison with the movement of the drill head, an abutment element mounted on the crosshead and adapted to engage the surface of a selected gauge element, each of said gauging elements having a relief area adapted to provide clearance relative to the abutment element, gauge actuating means for rotating the stacked gauging elements to a non-gauging position with said relief areas disposed in registry with said abutment element, adapting the drill head and crosshead to be shifted relative to the gauging elements, means for energizing the rapid traverse motor, thereby to shift the drill head, crosshead and abutment element relative to the gauging elements when the same are rotated to said non-gauging position, means for deenergizing the rapid traverse motor when the abutment resides adjacent a selected gauging element, means for energizing the said actuating means for rotating the stacked gauging elements to the gauging position after the abutment element resides adjacent the selected gauging element, and means adapted to energize the positioning motor, whereby the drill head, crosshead, and abutment are shifted at a positioning rate into engagement with the selected gauging element.

9. In a machine tool having a vertical column and having a drill head slidably mounted on the column, said drill head having an input shaft adapted to shift the drill head relative to the column, an apparatus for automatically positioning the drill head relative to the column comprising, a rapid traverse motor and a positioning motor, a differential transmission system connecting said motors to the input shaft, a series of stacked gauge elements mounted for rotary motion, a crosshead connected to the drill head for motion parallel with said stacked gauge elements, in unison with the movement of the drill head, an abutment element mounted on the crosshead and adapted to engage the surface of a selected gauge element, each of said gauging elements having a relief area adapted to provide clearance relative to the abutment element, gauge actuating means for rotating the stacked gauging elements to a non-gauging position with said relief areas disposed in registry with said abutment element, adapting the drill head and crosshead to be shifted relative to the gauging elements, means for energizing the rapid traverse motor, thereby to shift the drill head, crosshead and abutment element relative to the gauging elements when the same are rotated by the gauge actuating means to said non-gauging position, means for deenergizing the rapid traverse motor when the abutment resides adjacent a selected gauging element, means for energizing the said actuating means for rotating the stacked gauging elements to the gauging position after the abutment element resides adjacent the selected gauging element, means adapted to energize the positioning motor, whereby the drill head, crosshead and abutment are shifted at a positioning rate into engagement with a selected gauging element, and a final position control element mounted in a stationary position relative to one of said stacked gauging elements and engaging the same, said control element adapted to deenergize the positioning motor when the abutment is shifted into engagement with the selected gauging element.

10. In a machine tool having a vertical column and having a drill head slidably mounted on the column, said drill head having an input shaft adapted to shift the drill head relative to the column, an apparatus for automatically positioning the drill head relative to the column comprising, a rapid traverse motor and a positioning motor mounted on the drill head, a differential transmission system connecting said motors to said input shaft, a gauge carriage mounted for motion parallel to the column, a series of stacked gauge elements mounted for rotary motion in said gauge carriage, a crosshead connected to the drill head for motion parallel with said stacked gauge elements in unison with the movement of the drill head, an abutment element mounted on the crosshead and adapted to engage the surface of a selected gauge element, means for energizing the rapid traverse motor in a direction to shift the drill head, crosshead and abutment element to a position adjacent a selected gauging element through operation of the differential transmission system, means on said crosshead adapted to engage the selected gauge element and to deenergize the traverse motor in response to said engagement, said means adapted to energize the positioning motor in a direction to shift the drill head and crosshead toward the selected gauging element, whereby the abutment engages the selected gauging element, and a final position control element mounted in a stationary position relative to one of said stacked gauges and adapted to be shifted by the gauge element and thereby to deenergize the positioning motor to stop the drill head and crosshead at the selected position.

11. A gauging apparatus for positioning a drill head to a predetermined position relative to a vertical column, comprising, a gauge housing mounted upon said column, guide means in said housing, a gauge carriage mounted on said guide means for vertical motion relative to said housing, a series of stacked gauge elements mounted for rotary motion upon said carriage and having gauging surfaces spaced apart relative to one another, a crosshead shiftably mounted in said housing and connected to the drill head for motion relative to the said gauging elements in unison with the drill head, an abutment element mounted on the crosshead adapted to engage a selected gauging element, said gauging elements having aligned relief areas adapted to provide clearance relative to the abutment element, whereby the drill head and crosshead may be shifted relative to the gauges to a position locating the abutment element adjacent a selected gauging element, said gauging elements adapted thereafter to be rotated to a gauging position, whereby the drill head and crosshead may be shifted in a direction to bring the abutment element into engagement with the selected gauging element, thereby to shift the gauging elements and gauge carriage to a final position, said gauge elements adapted to stop the drill head at the predetermined position upon shifting of the gauges to said final position.

12. In a gauging apparatus for positioning a drill head to a predetermined position relative to a vertical column, a gauge housing mounted upon said column, guide means in said housing, a gauge carriage mounted on said guide means for vertical motion, a series of stacked gauge elements mounted upon said carriage, guide rails mounted within the housing, a crosshead shiftably mounted on said rails for motion relative to the said gauging elements, a rod element connecting the crosshead to the drill head for moving the crosshead in unison with the drill head, and an adjusting mechanism interposed between the drill head and rod adapted to shift the rod and crosshead vertically relative to the drill head in initially locating the crosshead relative to the gauging elements.

References Cited by the Examiner
UNITED STATES PATENTS

| | | | |
|---|---|---|---|
| 1,098,751 | 6/14 | Newton | 82—34.4 |
| 2,384,745 | 9/45 | Hoelscher | 77—32.1 |
| 2,757,579 | 8/56 | Stephan | 90—16 |
| 2,854,869 | 10/58 | Hirvonen | 77—32.1 |
| 2,924,016 | 2/60 | Diener | 33—125 |
| 2,932,088 | 4/60 | Knosp | 33—125 |
| 2,940,337 | 6/60 | Kalb | 74—675 |
| 3,028,768 | 4/62 | Bullard | 74—675 |

WILLIAM W. DYER, Jr., *Primary Examiner*.

FRANK H. BRONAUGH, JOHN C. CHRISTIE, *Examiners*.